United States Patent Office 2,888,005
Patented May 26, 1959

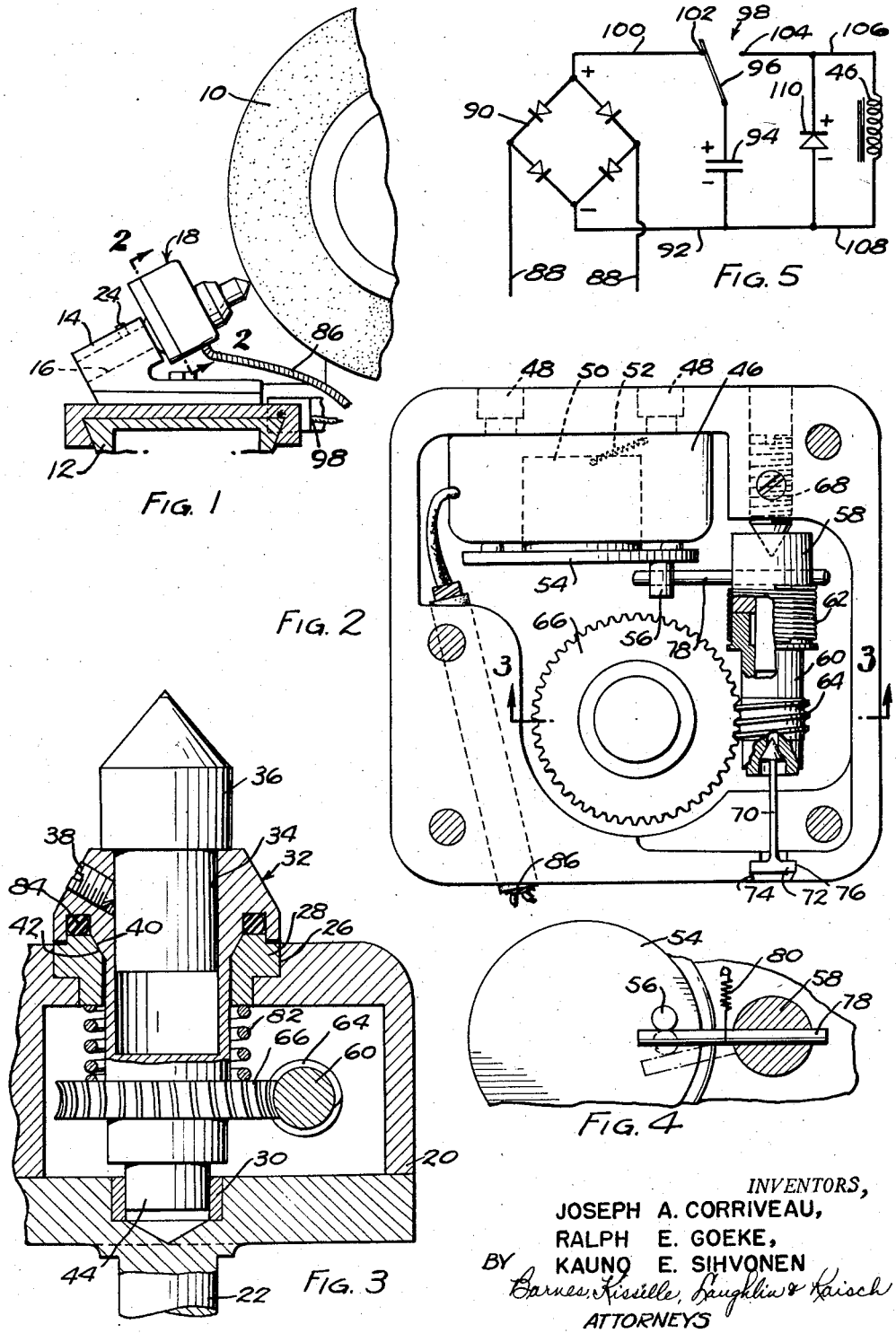

2,888,005

HOLDER FOR A DIAMOND DRESSING TOOL

Ralph E. Goeke and Joseph A. Corriveau, Detroit, Mich., and Kauno E. Sihvonen, Arcadia, Calif.; said Goeke assignor, by mesne assignments, to Harry A. Metz, Ferndale, Mich.

Application July 13, 1953, Serial No. 367,677

8 Claims. (Cl. 125—11)

This invention relates to a holder for a diamond dressing tool.

Tools of this type are customarily used for dressing or truing grinding wheels of a grinding machine. The tools employ one or more diamonds and since these diamonds wear with use, it is necessary to rotate the tool in its holder to present new cutting faces to the wheel being dressed. Random manual rotation of the tool produces inconsistent results and is wasteful of the diamonds.

It is an object of this invention to produce a holder for a diamond dressing tool which is constructed to automatically produce a slight rotation of the diamond before each pass of the tool across the wheel. The holder is furthermore constructed to rigidly hold the tool during the truing operation so as to prevent undue vibration.

Referring to the drawings:

Fig. 1 is a view generally illustrating the manner in which the tool holder of this invention is used.

Fig. 2 is a sectional view of the holder taken along the line 2—2 of Fig. 1.

Fig. 3 is a fragmentary sectional view of the holder taken along the line 3—3 of Fig. 2.

Fig. 4 is a fragmentary detail view of the holder.

Fig. 5 is an electrical wiring diagram of the holder.

Referring to Fig. 1, there is illustrated a grinding wheel 10 which is mounted on a machine (not shown) which includes a slide 12 on which a tool holder socket member 14 is mounted for movement transversely of the face of wheel 10. Socket member 14 is also arranged for adjustment toward and away from the wheel. Socket member 14 includes a bore 16 for receiving the shank of a tool holder. The tool holder of this invention is generally designated 18 and includes a casing 20 from the rear face of which a shank 22 extends. Shank 22 is adapted to be inserted in bore 16 and locked therein as by a set screw 24. The front face of casing 20 is provided with a counterbored opening 26 in which is press fitted a bearing member 28. Bearing 28 is preferably aligned axially with shank 22. The rear wall of casing 22 is also provided with a bearing 30 aligned axially with bearing 28. The tool holder member generally designated 32 is journalled in bearings 28 and 30.

Holder member 32 includes a socket portion 34 for receiving the shank of a diamond dressing tool 36. Tool 36 may be locked in holder 32 as by a set screw 38. Holder member 32 and bearing 28 are fashioned with complementary conical faces 40 and 42 respectively. This construction, coupled with the reduced shank portion 44 of holder member 32 which is received in bearing 30, provides a smooth rotating fit of the holder in the casing. The tapered seats 40 and 42 also provide a snug fit between bearing 28 and holder member 32 which reduces to a minimum vibration of the holder in casing 20.

For producing rotation of holder member 32 there is provided a rotary solenoid 46 which is mounted in casing 20 as by screws 48. Solenoid 46 is of the conventional rotary type and includes a core 50 which, when the solenoid is energized, rotates through a predetermined angle, an angle, for example, of about 45°. Means such as a spring shown at 52 are provided for returning core 50 to a fixed predetermined position whenever the solenoid is deenergized. A plate 54 is mounted on core 50 to rotate therewith and a pin 56 is mounted eccentrically on plate 54.

Within casing 20 and on an axis generally parallel to the axis of solenoid 50 and perpendicular to the axis of holder member 32, there are also mounted a pair of axially aligned, telescopically engaged shafts 58 and 60. A unidirectional clutch connects these shafts together so that whenever shaft 58 is rotated in one direction shaft 60 is likewise rotated a corresponding amount in the same direction. Any suitable form of one-way clutch may be employed for connecting these two shafts together. In the embodiment illustrated this clutch comprises a relatively fine coil spring 62 which is connected at one end with shaft 58 and which rather snugly embraces the adjoining ends of shafts 58 and 60. It will be observed that when shaft 58 is rotated in one direction spring 62 wraps itself tightly around both shafts and causes shaft 60 to rotate with shaft 58. When shaft 58 is rotated in the opposite direction, spring 62 unwraps itself from shaft 60 and does not produce rotation of shaft 60. Shaft 60 includes a worm portion 64 which meshes with a worm wheel 66 fixed on holder member 32.

An axially adjustable pivot pin 68 suports one end of shaft 58. A leaf spring pivot pin 70 having a head 72 which is staked as at 74 in a counterbored opening 76 in casing 20, supports the end of shank member 60. Spring pivot 70 is initially of flexed contour in its unstressed condition so that when it is engaged with shank member 60 it urges worm 64 against worm wheel 66 and causes the two to mesh tightly. The pitch of the teeth on worm 64 and wheel 66 is such that the drive is from worm 64 to wheel 66 and is not reversible.

A driving connection between solenoid 46 and shaft 58 is provided by a pin 78 extending transversely of shaft 58 into the path of movement of pin 56 on plate 54. A spring 80 may be employed for maintaining pin 78 in engagement with pin 56. The arrangement is such that when solenoid 46 is energized plate 54 is caused to rotate through approximately 45° in a clockwise direction as viewed in Fig. 4, and the engagement of pin 56 with pin 78 causes shaft 58 to rotate through a predetermined angle in a counterclockwise direction. In this direction of rotation of shaft 58, spring 62 is caused to wrap itself tightly around shaft 60 and the gear connection between shaft 60 and holder member 32 causes the holder member, together with the tool 36 engaged therein, to rotate through a predetermined angle. When the solenoid is deenergized, core 50 rotates counterclockwise to a predetermined fixed position and spring 80 causes shaft 58 to also return to its predetermined fixed position. However, by reason of the irreversible drive between worm 64 and worm wheel 66 and the one-way drive connection provided by spring 62, holder 32 is not caused to rotate back to its previous position. For the purpose of maintaining holder 32 in a rigid position during the operation of dressing the wheel, a coil compression spring 82 is provided. Spring 82 surrounds a portion of holder member 32 and has one end bearing against bearing 28 and its other end against worm wheel 66. A dirt seal 84 is arranged between holder 32 and bearing 28.

In Fig. 5 a suitable wiring diagram is illustrated for operating the solenoid 46 in the holder. A service cord 86 which includes leads 88 connects with a rectifier 90. The negative side of rectifier 90 is connected by a conductor 92 through a condenser 94 to the movable contact 96 of a switch 98. The positive side of rectifier 90 is connected by conductor 100 with one of the stationary contacts 102 of switch 98. The other stationary contact 104 of switch 98 is connected to one end of the winding of solenoid 46 by a conductor 106. The other end of the winding of solenoid 46 is connected by a conductor 108 with conductor 92. A dampening device, such as a rectifier 110, is connected across the opposite ends of the winding of solenoid 46.

For convenience, switch 98 may be mounted, as shown in Fig. 1, on the bed of the machine so that each time the holder 18 makes a pass across the face of wheel 10, switch 98 momentarily closes the circuit through solenoid 46 to index the tool 36 through a predetermined angle. Switch arm 96 normally occupies the position shown in Fig. 5, thus closing a circuit through the rectifier 90. When switch arm 96 is moved to close with contact 104, condenser 94 is discharged through solenoid 46, thus momentarily energizing the solenoid and producing the rotation of tool 36 as hereinbefore described. If desired, switch 98 may be used as a remote manual switch rather than a switch which is automatically actuated each time the tool holder makes a pass across the wheel.

We claim:

1. A diamond dressing tool holder comprising a support, a dressing tool retainer journalled for rotation on said support, a solenoid having a core member adapted to rotate when the solenoid is energized, a pair of shaft members on said support, one of said shaft members being operatively connected with said core member, said other shaft member having a worm gear portion, said retainer having a gear thereon interengaged with said worm gear portion, means forming a one-way clutch connection between said two shaft members, and means resiliently biasing said worm gear and said gear laterally into interengagement to prevent backlash therebetween.

2. The combination set forth in claim 1 wherein said resilient means comprise a bearing member supporting one end of said second mentioned shaft member on said support, said bearing member including a spring portion biasing said worm gear portion laterally into engagement with said gear.

3. The combination set forth in claim 2 including means resiliently biasing said retainer member to a position at rest on said support.

4. The combination called for in claim 1 wherein said resilient means includes a leaf spring fixed on said support and having an end portion providing a bearing for one end of said second mentioned shaft.

5. In combination, a support, a member journalled for rotation on said support, a solenoid having a core adapted to rotate when the solenoid is energized, a pair of shaft members on the support, one of the shaft members being operatively connected with the core member, the other shaft member having a worm gear portion thereon, a gear operatively associated with said rotatable member and interengaged with said worm gear portion, means forming a one-way clutch connection between said two shaft members, and means resiliently biasing said worm gear and said gear laterally into interengagement to prevent back-lash therebetween.

6. The combination set forth in claim 5 wherein said resilient means comprise a bearing member supporting one end of said second mentioned shaft member on said support, said bearing member including a spring portion biasing said worm gear portion laterally into engagement with said gear.

7. The combination set forth in claim 5 including means resiliently biasing said rotatable member to a position at rest on said support.

8. The combination set forth in claim 5 wherein said resilient means comprise a bearing member supporting one end of said second mentioned shaft member on said support, said bearing member including a spring portion biasing said worm gear portion laterally into engagement with said gear.

References Cited in the file of this patent

UNITED STATES PATENTS

| | | |
|---|---|---|
| 1,035,340 | Fresh | Aug. 13, 1912 |
| 1,367,283 | Simon | Feb. 1, 1921 |
| 1,692,409 | Hobbs | Nov. 20, 1928 |
| 1,887,843 | Ludwig | Nov. 15, 1932 |
| 2,096,458 | Johnson | Oct. 19, 1937 |
| 2,449,178 | Sansbury | Sept. 14, 1948 |
| 2,496,880 | Leland | Feb. 7, 1950 |
| 2,564,613 | Seborg | Aug. 14, 1951 |
| 2,570,518 | Bryan | Oct. 9, 1951 |
| 2,576,609 | Kreiner | Nov. 27, 1951 |
| 2,587,172 | Kroebel | Feb. 26, 1952 |
| 2,614,672 | Launder | Oct. 21, 1952 |

FOREIGN PATENTS

| | | |
|---|---|---|
| 133,824 | Australia | Aug. 11, 1949 |
| 644,865 | France | June 19, 1928 |